June 30, 1970 L. SARATI 3,518,549

AUTOMATIC PROTECTION SWITCHING SYSTEM FOR COMMUNICATION CHANNELS

Filed Oct. 24, 1965 5 Sheets-Sheet 1

INVENTOR

LUIGI SARATI

BY Young & Thompson

ATTORNEYS

June 30, 1970 L. SARATI 3,518,549

AUTOMATIC PROTECTION SWITCHING SYSTEM
FOR COMMUNICATION CHANNELS

Filed Oct. 24, 1965 5 Sheets-Sheet 2

INVENTOR
LUIGI SARATI
BY
Young + Thompson
ATTORNEYS

INVENTOR
LUIGI SARATI
BY Young + Thompson
ATTORNEYS

INVENTOR
LUIGI SARATI
BY
Young & Thompson
ATTORNEYS

INVENTOR
LUIGI SARATI
BY
Young & Thompson
ATTORNEYS

United States Patent Office 3,518,549

Patented June 30, 1970

3,518,549

AUTOMATIC PROTECTION SWITCHING SYSTEM FOR COMMUNICATION CHANNELS

Luigi Sarati, Milan, Italy, assignor to Societá Italiana Telecomunicazioni Siemens S.p.A.

Filed Oct. 24, 1965, Ser. No. 504,443
Claims priority, application Italy, May 6, 1965, 10,355/65
Int. Cl. H04b 7/02; H04l 1/02
U.S. Cl. 325—56 7 Claims

ABSTRACT OF THE DISCLOSURE

A work-reserve switching system is provided for a plurality of communication channels which include a plurality of working channels and a reserve channel. There are a transmitter and a receiver for each channel; and when a fault condition develops at any working channel receiver, a fault indication signal is given which substitutes the transmitter and receiver of the reserve channel for the transmitter and receiver of the faulty working channel.

This invention relates to a work-reserve switching system in a number of hertzian, that is communication channels comprising several working channels and a single reserve channel.

In hertzian bands made up of several working channels and a single reserve channel, automatic switching devices are used which bring in the reserve channel when there is some trouble in one of the working channels. Prior art systems of this type have not been highly reliable or have not been highly flexible.

An object of this invention is to provide a circuit arrangement for highly reliable control of such switching, as well as for increasing the flexibility of reserve availability whereby the reserve channel is placed at the disposal of the channel that shows the most serious trouble or is in a special condition.

These and other characteristics of the invention will be seen more clearly in the following description. The description is made with reference to the attached drawings, which represent one method of construction, without however limiting in any way the construction possibilities to the method followed in this example .

In the drawings:

FIG. 1 represents a block-pattern for all the channels and devices for work-reserve switching according to the invention.

FIG. 2*a* represents schematically the devices that control *i* channel switching.

FIG. 2*b* illustrates the combination of FIGS. 3, 4 and 5 to obtain a detailed representation of the circuit illustrated schematically in FIG. 2*a*.

Figure 6:
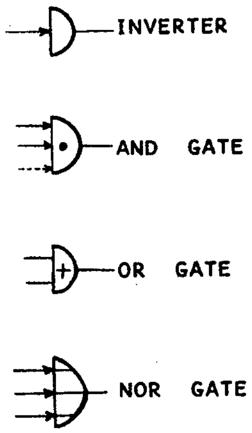

FIG. 6 defines the symbols used in the remaining figures.

The work-reserve switching system provided by this invention is concerned with a plurality of information-transit channels (*m* working channels) and a single reserve channel (*o* channel).

With this invention, the switching of a basic *i* channel onto the *o* channel takes place as follows:

At the transmitting end of the *i* channel (hereinafter called the transmitting section), there is a transmitter $T_1$ (FIG. 1) and a shunt unit capable of shunting the signal that enters to the reserve-channel transmitter $T_o$. This operation is a shunt control by means of signal $h_i$ operating upon the switch $H_i$.

At the receiving end (hereinafter called the receiving section), there is a receiver $R_i$, a control unit $L_i$, and a switch unit $q_i$. Acting on a command, the switch unit switches the receiving section onto the reserve-channel receiver $R_o$. The control unit $L_i$ checks information-transit characteristics to signal eventual troubles. More precisely, if the quality of the information deteriorates (for example, if the signal to noise ratio drops below a certain level), the control unit emits a request $J_{i1}$ to switch to the reserve channel. If, on the other hand, transmission is interrupted, the control unit $L_i$ emits a switch request $J_{i2}$ which is distinct from $J_{i1}$. Requests from the control unit $L_i$ are sent to the processing unit $ER_i$. The latter is to be found in the receiving section which processes these requests to give the command—together with the unit $ET_1$ in the transmitting section—for switching the *i* channel onto the reserve channel *o*. To make the description of the unit $ER_i$ easier, the latter may be considered as being divided into three logical units $BL_i$, $DI_i$, $UC_i$, which have the following characteristics:

$DI_i$ receives switch requests $J_i$ and sends out switch commands $U_i$ according to a transduction function that works on a basis of priority selection of channel requests. Such priority may be shown in view of the type of trouble signalled and/or the channel's priority signal.

$BL_1$ blocks switch requests $J_1$ if the channel is signalled as out of order. In fact, this is done by means of two signals $b_h$ and $b_n$ which respectively cancel both $J_{i1}$ and $J_{i2}$ or the single $J_{i1}$ requests.

The $UC_i$ unit, in connection with the $U_i$ command, transmits a switch signal $g_i$ to the $ET_i$ unit when the reserve channel transmitting section is not already being used by other channels. Moreover $UC_i$ stores the command $U_i$ and then emits it as command $q_i$, after the transmitting section shunt of *i* channel onto the reserve channel has been confirmed.

In the $ET_i$ unit the signal $g_i$ is translated into a switch command $h_i$ when the reserve channel in the same section is not occupied by other channels.

A signal K is sent to the unit $ER_i$ to confirm the completed shunt of the *i* channel onto the reserve channel. To increase the system's reliability, freezing of the reserve channel's state has been made possible if there are troubles in the hertzian connections carrying the transmission between $ER_i$ and $ET_i$ of the signals $g_i$ and K. In fact, trouble discovered in the receiving section is signalled through a freezing request C. The freezing request C acts on the $BL_i$ and $UC_i$ units so that the output $U_i$ does not suffer, whatever later variations there might be in the state of requests $J_i$. Likewise, trouble discovered in the transmitting section is signalled by a freezing request C′. The freezing request C′ acts on the $ET_i$ unit so that the output $h_i$ does not suffer, whatever later variations there might be in the state of requests $g_i$. One favored method of construction of the unit $DI_i$ will be such that it offers the following transduction functions:

$$U_i = U_{i1} + U_{i2} \tag{a}$$

$$U_{i1} = J_{i2}\overline{b}_n \prod_{1}^{i-1} \overline{U}_n \prod_{i+1}^{m} \overline{U}_n \tag{b}$$

$$U_{i2} = J_{i2}\overline{b}_h \prod_{1}^{i-1} \overline{U}_{n2} \prod_{i+1}^{m} \overline{U}_{n2} + T_i \tag{c}$$

the unit $BL_i$ offers transduction functions:

$$\overline{b}_h = \overline{J}_{o2}(\Sigma U_n + \overline{U}) \tag{d}$$

$$\overline{b}_n = \overline{J}_{o1} \cdot \overline{J}_{o2} \cdot (\Sigma U_n + \overline{U}) \tag{e}$$

the unit $UC_i$ has the following transduction functions:

$$g_i = U_i(g_i + K) \tag{f}$$

$$q_i = \overline{K} \cdot g_1 \tag{g}$$

$$T_1 = C \cdot q_1 \tag{h}$$

the unit $ET_i$ has the transduction functions:

$$h_i = g_i \prod_{1}^{i-1} \bar{h}_n \prod_{i+1}^{m} \bar{h}_n C' h_i \quad \text{(i)}$$

$$K = \prod_{1}^{m} \bar{h}_n \quad (1)$$

In the above equations, C stands for a breakdown in the receiving section hertzian connections, which are used respectively for transmitting data $g$ into $ET_i$ and data K into $ER_i$.

In the same way, C′ stands for a breakdown in the transmitting section hertzian connections, which are used respectively for transmitting data $g_i$ into $ET_i$ and data K into $ER_i$.

There will be considered a group of $m+1$ information-transit channels made up of $m$ working channels and a single reserve channel—the latter being concerned with a portion or stretch of the channel group between sections $V_1$ and $V_2$.

Figure 1:
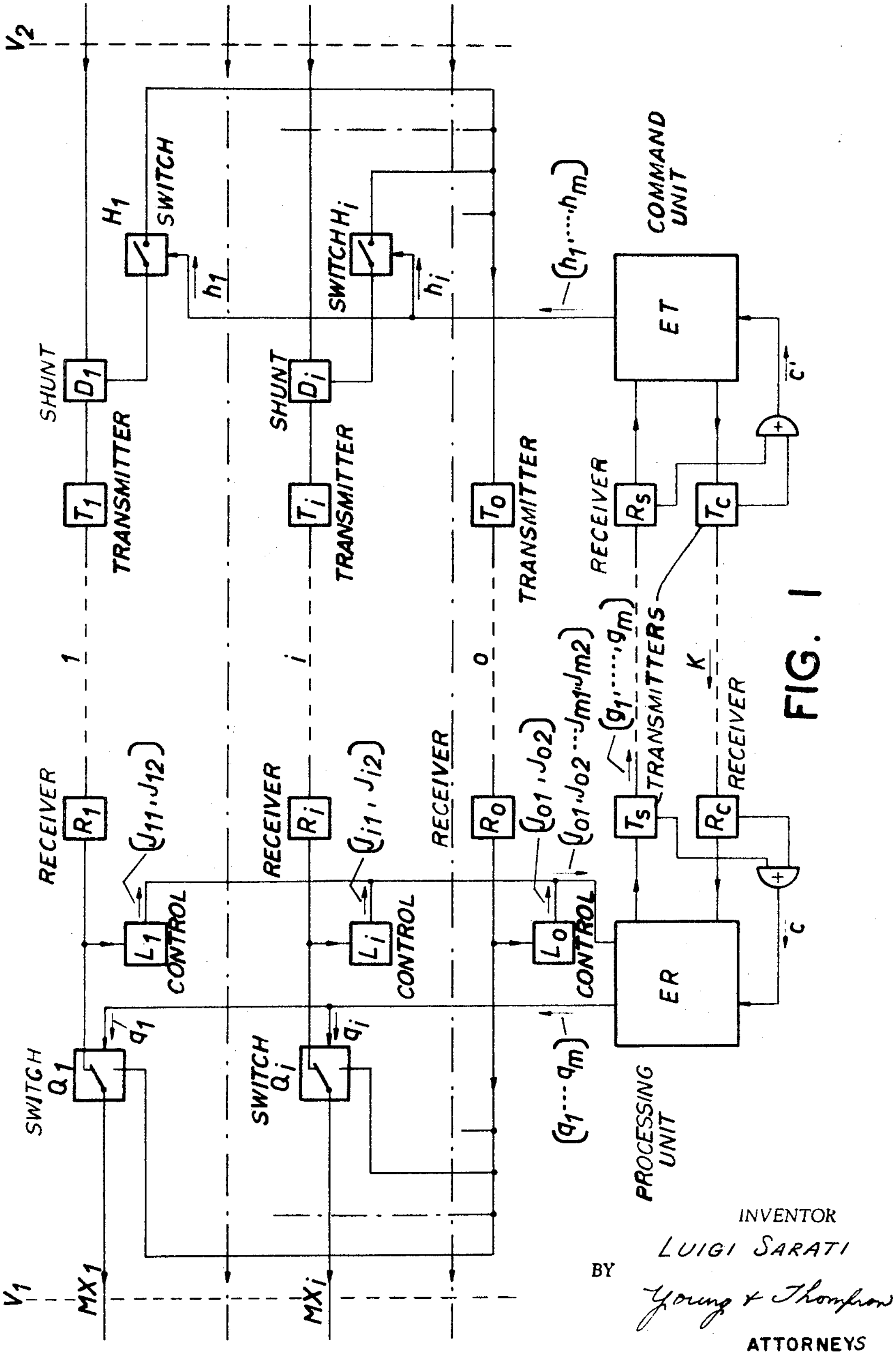

Such an arrangement is illustrated in FIG. 1, where for the sake of simplicity, channel 1, the generic channel $i$, and the reserve channel $o$, have been shown completely, while the dot-dash lines represent the other channels.

In the generic $i$ channel, information transits from $V_2$ to $V_1$. In the part of the portion or stretch near $V_2$, which will be called the transmitting section, the units $T_i$, $D_i$, and $H_i$ are to be found in succession.

Unit $T_i$ is the transmitting station of the radio bridge. Unit $D_i$ is a shunt device (fork), while $H_i$ is a connecting device for linking the $D_i$ shunt with the $T_o$ transmitter of the reserve channel $o$. In the part near $V_1$, which shall be called the receiving section, the units $R_i$, $L_i$, and $Q_i$ are to be found in succession according to the transmission direction of the information.

Unit $R_i$ represents the receiving station of the radio bridge.

Unit Q represents a switch device for connecting the $MX_i$ output with the receiver $R_o$ of the reserve channel $o$.

Unit $L_i$ has the task of supervising the working conditions of the $V_1$–$V_2$ portion or stretch of the $i$ channel and of sending out, on the basis of these conditions, eventual $J_i$ signals requesting the switching of channel $i$ onto reserve channel $o$.

As the request to switch channel $i$ cannot be fulfilled unless the reserve channel is avaiable, an ER unit is necessary which will receive the request and give the switch command depending on availability. In the system described here, switch requests for the same channel, which have two different degrees of importance, have been provided for. Such may be the case, for example, when a channel shows a simple quality-deterioration in its transit information (first-degree request $J_{i1}$), or when there is a breakdown in transmission (second-degree request $J_{i2}$). Thus the ER unit must also be able to distinguish between a present and a previous request's degree of importance in order to give priority to the more serious trouble.

Figure 2A:
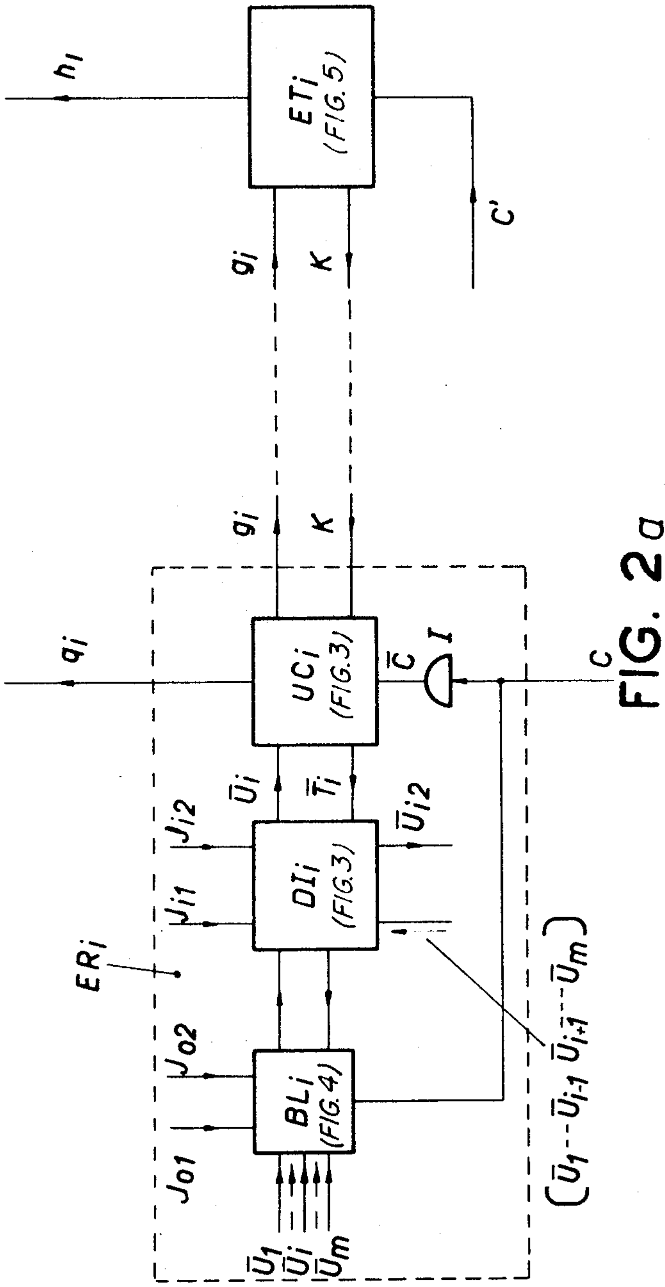
Figure 2B:
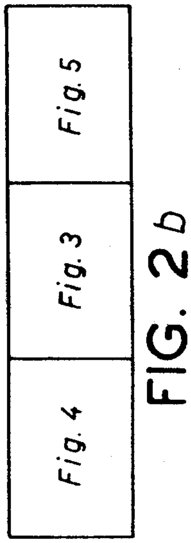

So as to make ER unit's behavior more readily understandable, reference is made in the following account to a single partial unit $ER_i$ (FIG. 2*a*), which can be imagined as making up part of the ER unit. Among the $m$ transmit channels, this $ER_i$ section is at the service of the $i$ channel.

The partial $ER_i$ unit can be considered as being made by coupling the blocking unit $BL_i$, the information-distribution unit $D_i$, and the confirmation unit $UC_i$. The $DI_i$ unit receives switch requests $J_i$ and sends out corresponding switch commands $U_i$ according to a transduction function that allows for priority selection among the channel requests. See for example my allowed copending application Ser. No. 366,116, filed May 8, 1964.

To understand the present invention, it is enough to show the $DI_i$ unit in an illustration of its principle (FIG. 3) together with the corresponding transfer function— the transfer illustrated, however, does not exhaust the eventual possibilities:

$$U_1 = U_{i1} + U_{i2} \quad (1)$$

$$U_{i1} = J_{i1} \cdot \bar{b}_n \cdot \prod_{1}^{i-1} \bar{U}_n \cdot \prod_{i+1}^{m} \bar{U}_n \quad (2)$$

$$\bar{U}_{i2} = J_{i2} \cdot \bar{b}_h \cdot \prod_{1}^{i-1} \bar{U}_{n2} \cdot \prod_{i+1}^{m} \bar{U}_{n2} + T_i \quad (3)$$

The meaning of the above equations will be illustrated.

Assuming $T_i$ is missing, a request $J_{i2}$ can be changed into the corresponding command $U_{i2}$ in output from $DI_i$—if there are no other $U_{i2}$ commands concerning the remaining channels (commands deriving from second-grade requests $J_{n2}$). If there should be a command $U_{n1}$ already coming from other channels, this command will be cancelled by the arrival of the signal $U_i = U_{i2}$. The condition necessary for a $J_{i1}$ request to change into the corresponding order $U_{i1}$, is that there are no other orders present ($U_n$) concerning the remaining channels (either deriving from request $J_{n1}$ or $J_{n2}$). The $BL_i$ unit illustrated in FIG. 4 processes two blocking signals $b_h$ and $b_n$:

$$\bar{b}_h = \bar{J}_{o2} \cdot (\Sigma U_i + \bar{C}) \quad (4)$$

$$\bar{b}_n = \bar{J}_{o1} \cdot \bar{J}_{o2} \cdot (\Sigma U_i + \bar{C}) \quad (5)$$

C is a freezing signal introduced into the system to keep the reserve channel situation unchanged by making any switch or release request from ER ineffective. C is signalled whenever a breakdown is located in $T_s$ or $R_c$ (see FIG. 1 in which $T_s$ and $R_c$ represent, in the receiving section, the transmitter and the receiver of the hertzian connection between ER and ET). The variables $J_{o1}$ and $J_{o2}$ represent deterioration and breakdown signals respectively as regards the reserve. The $U_i$ functions shown above are not exhaustive—being open to change according to the various requirements needed. If, for example, the information carried on one channel is more important than that on others, the priority given to this channel K in its switch requests is translated to the new form of the equation:

$$U_{k2} = J_{k2} \cdot b_n + T_k \quad (6)$$

which replaces Equation 3 for the K channel.

The other part $U_{k2}$ of the $U_k$ equation preserves the form of Equation 2 if the priority is limited to second-degree breakdowns $J_{i2}$.

The transduction functions of $UC_i$ (FIG. 3) are:

$$g_i = U_i(g_i + K) \quad (7)$$

$$q_i = \bar{K} \cdot g_i \quad (8)$$

$$T_i = C \cdot q_i \quad (9)$$

From these equations it can be deduced that the command $U_i$ changes to a corresponding shunt request $g_i$ in the transmitting section only when the signal K is present indicating that the reserve channel is free in the transmitting section. Once the signal $g_i$ is brought to the state 1, it remains as such until the signal $U_i$ is present.

The confirming unit $UC_i$ transforms the request $g_i$ into the corresponding switch command $q_i$ in the receiving section only when the signal K is received as confirmation that the $i$ channel has been shunted onto the reserve channel in the transmitting section. In this way, temporary interruptions in reception are avoided—interruptions which would have occurred whenever a receiving section switch took place before the corresponding shunt in the transmitting section.

Figure 3:
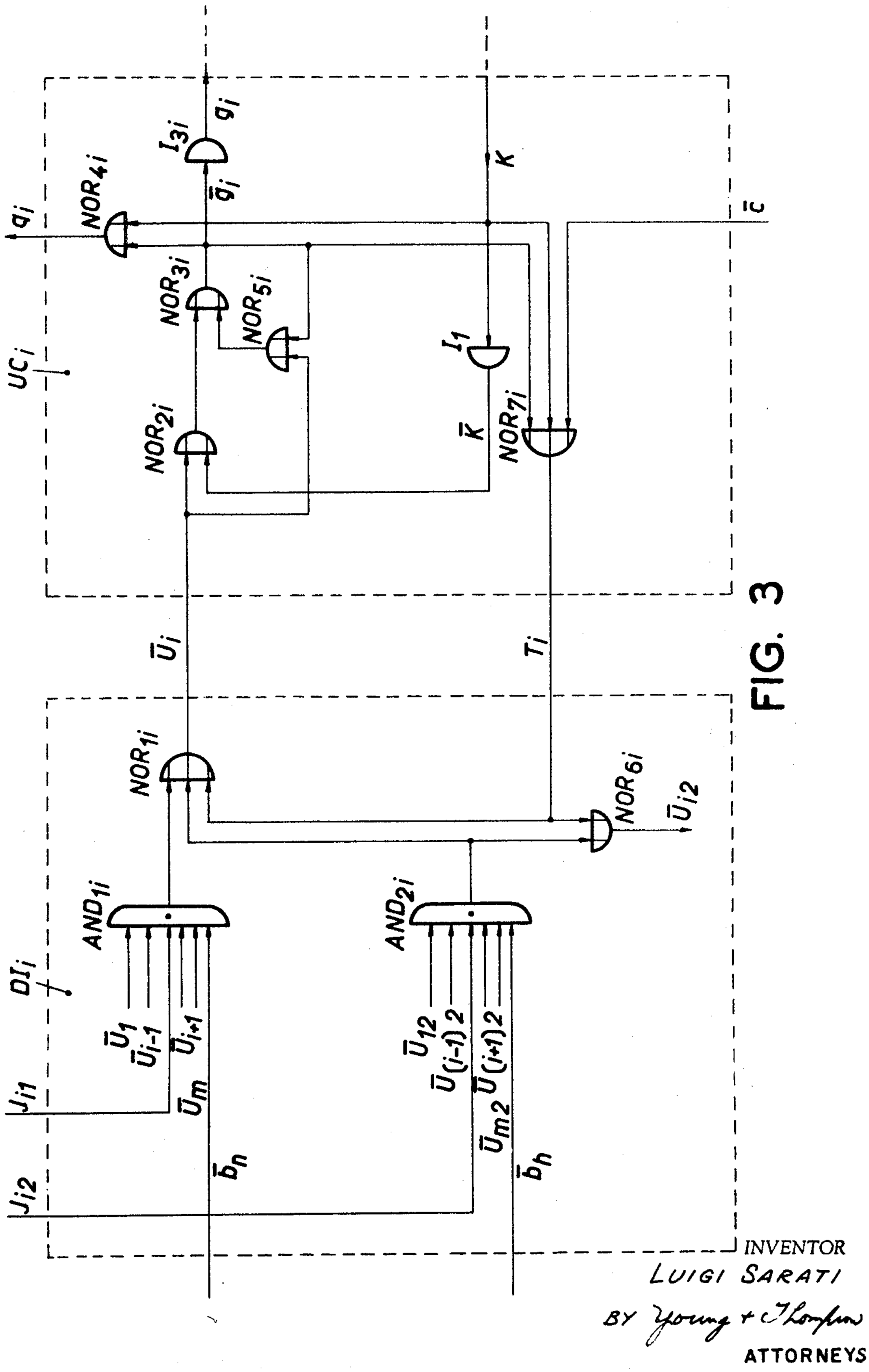
FIG. 3 represents the principles of the $DI_i$ and $UC_i$ units.

Information $T_i$ is given to the distributor $DI_i$ in freezing conditions and it serves to keep the distributor output $U_i$ activated, even when the signals $J_{i1}$ and $J_{i2}$, which originated it, cease (in FIG. 3, $T_i$ is supplied by $NOR_{71}$ which produces the logical product $g_i \cdot \bar{H} \cdot C$). The operation of the unit $ET_i$ (FIG. 5) can be expressed by the following transduction function:

$$h_i = g_i \prod_{1}^{i-1} \bar{h}_n \cdot \prod_{i+1}^{m} \bar{h}_n + C'h_i \qquad (10)$$

$$K = \prod_{1}^{m} \bar{h}_n \qquad (11)$$

From the above equations, it can be deduced that the request $g_i$ is transformed into a corresponding shunt order $h_i$ only if the reserve channel is not already occupied by other channels. The signal C′ serves to keep the output $h_i$ activated in freezing conditions even when the signal $g_i$, which originated it, ceases (in FIG. 5, the logical product $C'\cdot h_i$ is obtained through $NOR_{10i}$). The signal K, sent through a telecommand channel to the unit ER, indicates the availability condition of the reserve channel.

Figure 4:
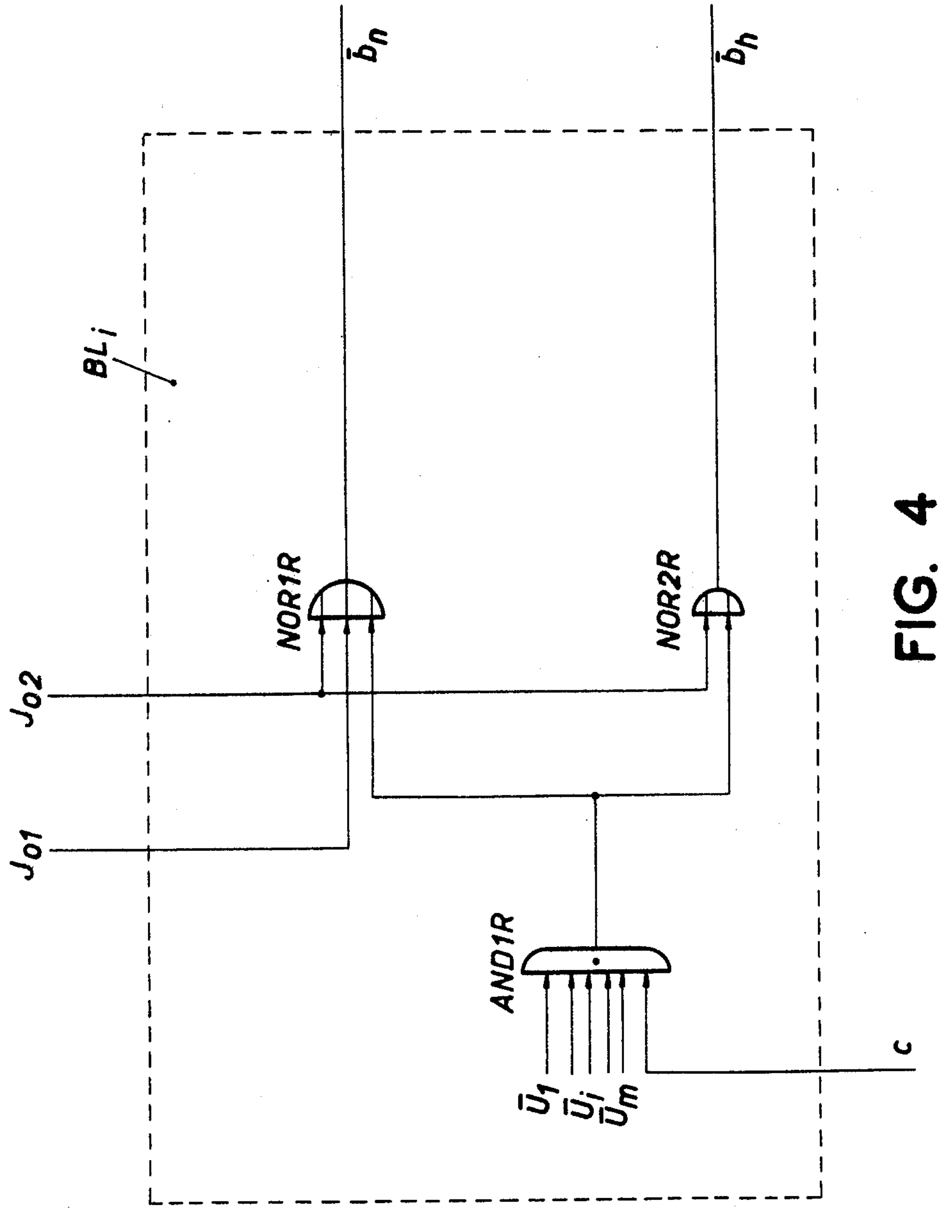
FIG. 4 shows the principle of the $BL_i$ unit.
Figure 5:
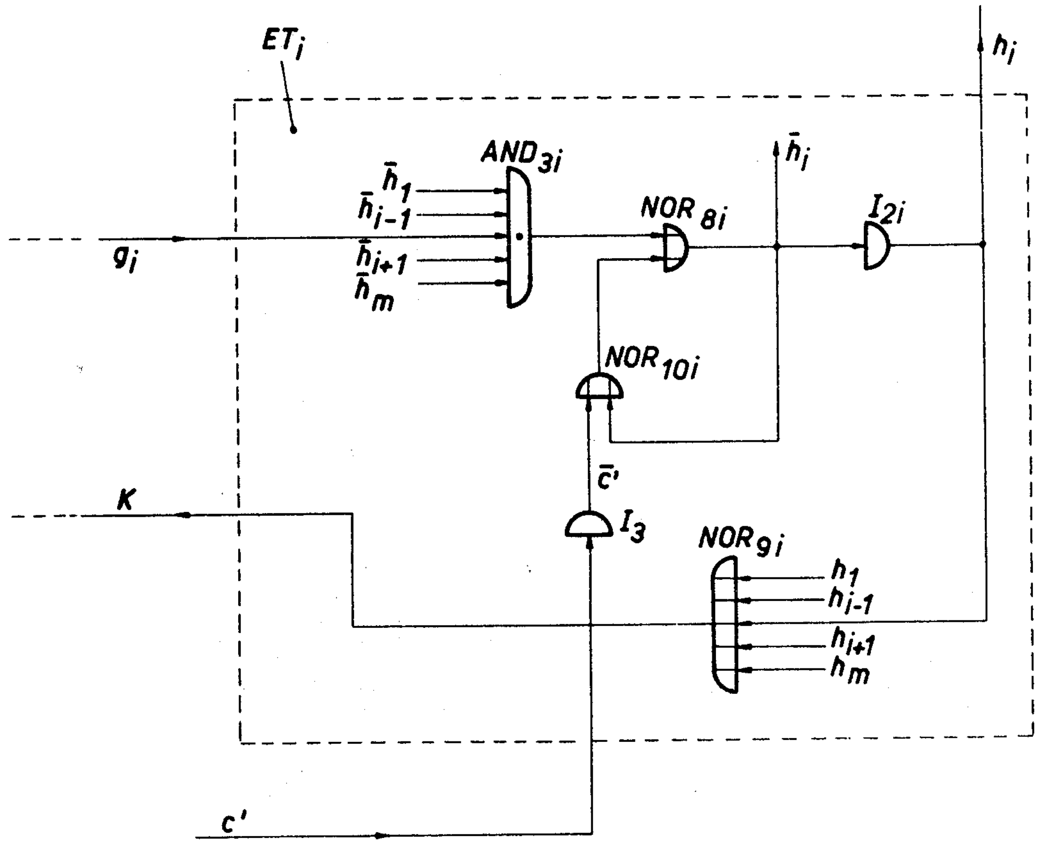
FIG. 5 represents the principle of the $ET_i$ unit.

The operation of the entire system with reference to FIGS. 3, 4 and 5, and considering the various situations that may occur will now be illustrated. It is assumed, as said before, that among the *n* transit channels, one which shall be called K, has priority as per Equation 6.

1st case: The reserve channel is free and in working order and a signal $J_{i1}$ or $J_{i2}$ reaches the processor from the control units $L_i$ of the *i* channel (the other channels are in working order). Under these conditions in the $DI_i$ unit, there shall be, in input $$\bar{U}_1 = \bar{U}_2 \ldots \bar{U}_{i-1} = \bar{U}_{i+1} = \ldots \bar{U}_n = 1$$

and $J_{i1}=1$ (or $J_{i2}=1$). The output from $AND_{1i}$ becomes 1 so that the output from $NOR_{1i}$ becomes $\bar{U}_i = o$ and as a multiple goes to the remaining $DI_n$ units in relation to the other channels, blocking the respective $AND_{1n}$ units.

The output $\bar{U}_i = o$ of $NOR_{1i}$ enters the confirmation unit $UC_i$, or more exactly, this unit's first $NOR_{2i}$ input. The second $NOR_{2i}$ input is the signal $\bar{K}$ coming from the $ET_i$ unit according to the Equation 11.

As the reserve is free, the information K is in condition 1, and thus the $NOR_{2i}$ output will pass from 0 to 1.

The fact that 1 is present at the $NOR_{3i}$ input, will, however, change its output from 1 to 0 and thus the $g_i$ output will pass to a 1 condition. The signal $\bar{g}_i$ is applied to one of the two $NOR_{4i}$ inputs—the second input being linked to the information K, which will keep the output $q_i$ blocked as long as K remains in condition 1.

The information $g_i=1$, transmitted to $ET_i$, is applied to the input of $AND_{3i}$, the other inputs of which are all in condition 1, assuming the reserve channel is free. The $AND_{3i}$ output will thus pass from 0 to condition 1 and the latter will be applied to one of the two $NOR_{8i}$ inputs. The output $\bar{h}_i$ of $NOR_{8i}$ will pass from 1 to 0, blocking the various $AND_{3n}$ of the other channels and activating the $NOR_{9i}$ input—which will change the signal K from 1 to 0. The new value of the variable K will free $NOR_{4i}$ of $UC_i$ so as to allow the switch in reception.

At the same time, it will block the $NOR_{2n}$ of all the $UC_n$ units—so as to guard against the following eventualities: suppose that channel *i*, switched onto the reserve channel, is at a certain moment returned to its normal working section, while simultaneously *n* channel sends an alarm signal which is translated in the presence of a $U_n$ signal at the $NOR_{2n}$ input. If the K input had not been forseen in $NOR_{2n}$, $U_n$ would continue its journey and activate the $q_n$ and $g_n$ outputs (since K is still present). This would produce the undesirable effect of switching in reception before having shunted the corresponding channel onto the reserve channel (in transmission). In order to prevent the K signal from blocking channel *i*, which is involved in the switching also, a storage circuit has been provided. The latter is made up of the $NOR_{3i}$ and the $NOR_{5i}$, which perform the transferring function $g_i = U_i(g_i + K)$. The switch having taken place in reception, the operation may be considered finished; the arrangement will continue as long as the are alarms at the processor input.

If, instead of $J_{i1}$, the alarm $J_{i2}$ should be given, the system followed is the same, with the sole difference that the effects on the other channels are translated into a prohibition of $AND_{1n}$ and $AND_{2n}$ (the latter are blocked by the $NOR_{6i}$ output $U_{i2}=0$).

2nd case: The reserve channel is occupied by a broken-down channel ($J_{n2}=1$). This channel will continue to function on the reserve channel even if there are breakdown alarms from any other channel that has no priority. In fact, the information $\bar{U}_n=0$ and $U_{n2}=0$ block the various $AND_1$ and $AND_2$ of every channel. If, on the other hand, a breakdown signal $J_{k2}$ comes in on the priority *k* channel, it is allowed to pass through its own $AND_{k2}$ of $DI_k$ and by means of the output $\bar{U}_{k2}=0$, it excludes the *n* channel from the reserve channel. Thus an eventual $J_{k1}$ signal would not change the state of the system.

3rd case: The reserve channel is occupied by a normal deteriorated channel. Since the corresponding output $\bar{U}_n$ blocks only the various $AND_1$ of the other channels, the reserve channel is occupied by channel *n* until another *i* channel carries the signal $J_{i2}$. In the latter case, the signals $\bar{U}_{i2}=0$ and $\bar{U}_i=0$ would be produced in the $DI_i$ section—such signals would exclude the *n* channel from using the reserve channel, and would instead take its place in the reserve channel.

4th case: The reserve channel's condition has deteriorated. If the reserve's condition has deteriorated ($J_{o1}=1$), the information $\bar{b}_n=0$ blocks the various $AND_{1n}$ of every channel. Thus the reserve channel is not used by any deteriorated channel. If a breakdown switch request is transmitted by an *i* channel, as the $AND_{2i}$ is not blocked. the information will pass on, and the deteriorated reserve channel will be used by the broken-down *i* channel.

5th case: Reserve channel breakdown. If the reserve channel breaks down, $J_{o2}=1$ and thus $\bar{b}_n=\bar{b}_h=0$. This blocks the various $AND_1$ and $AND_2$ of every channel and also makes it impossible for any channel to use the reserve channel (including the priority K channel).

The system's working conditions may be summed up in the following table, in which the symbols 1 and 0 stand for acceptance or refusal of the switch request:

| | Switch request | | | |
|---|---|---|---|---|
| | Normal channel | | Priority channel | |
| Reserve channel | Deterioration | Breakdown | Deterioration | Breakdown |
| (1) Free | 1 | 1 | 1 | 1 |
| (2) Occupied by normal deteriorated channel | 0 | 1 | 0 | 1 |
| (3) Occupied by normal broken-down channel | 0 | 0 | 0 | 1 |
| (4) Deteriorated | 0 | 1 | 0 | 1 |
| (5) Broken-down | 0 | 0 | 0 | 0 |

Though the invention has been described with respect to a specific embodiment thereof, many modifications and variations thereof will become apparent to those skilled in the art. It is therefore the intention that the appended claims be interpreted as broadly as possible in view of the prior art to include all such modifications and variations.

What is claimed is:

1. A work reserve switching system for a number of communication channels including a plurality of normally active working channels and a normally inactive reserve channel, each said channel including a transmitter for transmitting information from a channel input and a receiver for receiving information transmitted by said transmitter, comprising first switching means connected in each working channel and operative upon receipt of a first switch signal to substitute the transmitter of said reserve channel for the transmitter therein, second switching means connected in each working channel and operative upon receipt of a second switch signal to substitute the receiver of said reserve channel for the receiver therein, fault sensing means connected in each channel and responsive to fault conditions occurring therein, said fault sensing means being operative to provide a first fault request signal if the quality of transmission in a respective channel deteriorates and a second fault request signal if the transmission in a respective channel is interrupted, and processing means connected to receive said first and second request signals from said channels, said processing means including means normally operative in response to said fault request signals from a respective working channel to provide said first and second switch signals to the first and second switching means for said channel while blocking all switch signals in response to a second fault request signal from said reserve channel, said processing means including means to accord priority to second request signals from a working channel over first request signals from any working channel.

2. The work reserve switching system of claim 1 wherein said processing means includes receiver control section means adapted to receive a conformation signal and operative in response thereto to provide said second switch signal, said receiver control section means being connected to receive said fault request signals from said channels and operative in response to a working channel fault request signal in the absence of a fault request signal from said reserve channel or a fault request signal of higher priority to provide a switch command signal and transmitter control section means adapted to receive said switch command signal and operative in response thereto to provide said first switch signal and to transmit a conformation signal to said receiver control section means.

3. The work reserve switching system of claim 2 wherein said receiver control section means includes information distribution circuit means for receiving said first and second fault request signals from said working channels, said information distribution circuit means operating to provide switch control signals according to a transduction function that is determined by working channel priority and the priority of said second fault request signals relative to said first fault request signals, blocking circuit means adapted to receive fault request signals from said reserve channel and responsive thereto to prevent operation of said distribution circuit means, and conformation circuit means connected to receive the switch control output signals from said information distribution circuit means, said conformation circuit means operating when said reserve channel is not in operation to provide said switch command signal upon receipt thereby of said switch control output signals and said second switch signal upon receipt thereby of the conformation signal from said transmitter control section means.

4. The work reserve switching system of claim 3 wherein said conformation circuit means includes a transmitter for transmitting said switch command signals and a receiver for receiving said conformation signals, and conformation circuit sensing means to sense malfunction of either said transmitter or receiver, said conformation circuit sensing means operating upon occurrence of a malfunction to provide a freeze signal to said receiver control section means to maintain unchanged any existing switch command output signal therefrom, said transmitting control section including a receiver to receive said switch command output signal, a transmitter to transmit said conformation signal, and sensing means operative to sense a fault condition in the transmitter or receiver of said transmitter control section means, said sensing means providing a signal upon occurrence of a fault condition to cause said transmitter control section means to maintain unchanged any existing first switch signal therefrom.

5. The work reserve switching system of claim 1 wherein said first switching means includes a first shunt circuit connected between the input to said working channel transmitter and the input to said reserve channel trasmitter and a first signal responsive switch means in said first shunt circuit, said first signal responsive switch means normally operating to block said first shunt circuit but being activated by said first switch signal to complete said first shunt circuit to the input of said reserve channel transmitter, and said second switching means includes a second shunt circuit connected between the output of said working channel receiver and the output of said reserve channel receiver, and a second signal responsive switch means in said second shunt circuit, said second signal responsive switch mean normally operating to block said second shunt circuit but being activated by said second switch signal to open the output circuit from said working channel receiver and to complete said second shunt circuit to the output of said reserve channel receiver.

6. The work reserve switching system of claim 3 wherein said conformation circuit means includes storage means to store said switch control output signals received from said information distribution circuit means, said storage means operating to release said switch control output signals for transmission as said second switch signal to said second witching mean upon receipt thereby of said conformation signal.

7. The work reserve switching system of claim 1 wherein said processing means includes means to pass first and second switch signals in response to a second fault request signal from a working channel and a first fault request signal from said reserve channel.

References Cited

UNITED STATES PATENTS

| | | | |
|---|---|---|---|
| 2,733,296 | 1/1956 | Maggio | 325—2 |
| 2,892,930 | 6/1959 | Magnuski et al. | 325—56 |
| 3,111,624 | 11/1963 | Farkas | 325—2 |
| 2,572,912 | 10/1951 | Bucher | 325—302 |
| 3,268,816 | 8/1966 | Featherston | 325—302 |
| 3,328,697 | 6/1967 | Duncan et al. | 325—304 |

RICHARD MURRAY, Primary Examiner

B. V. SAFOUREK, Assistant Examiner

U.S. Cl. X.R.

178—69; 340—147